(12) United States Patent
Overby (10) Patent No.: US 9,071,581 B2
(45) Date of Patent: Jun. 30, 2015

(54) SECURE STORAGE WITH SCSI STORAGE DEVICES

(71) Applicant: NVIDIA CORPORATION, Santa Clara, CA (US)

(72) Inventor: Mark A. Overby, Bothell, WA (US)

(73) Assignee: NVIDIA CORPORATION, Santa Clara, CA (US)

( * ) Notice: Subject to any disclaimer, the term of this patent is extended or adjusted under 35 U.S.C. 154(b) by 95 days.

(21) Appl. No.: 14/034,380

(22) Filed: Sep. 23, 2013

(65) Prior Publication Data

US 2015/0089218 A1    Mar. 26, 2015

(51) Int. Cl.
*H04L 9/00*        (2006.01)
*H04L 29/06*       (2006.01)

(52) U.S. Cl.
CPC .... *H04L 63/0457* (2013.01); *G06F 2213/0038* (2013.01); *G06F 2213/0036* (2013.01)

(58) Field of Classification Search
CPC ............... G06F 2213/0036; G06F 2213/0038; G06F 2213/0042; H04L 63/0457; H04L 63/0428; H04L 63/123; H04L 9/3244
USPC ......................................................... 713/161
See application file for complete search history.

(56) References Cited

U.S. PATENT DOCUMENTS

| 2005/0021944 | A1* | 1/2005 | Craft et al. ..................... 713/161 |
| 2006/0259782 | A1* | 11/2006 | Wang et al. ................... 713/189 |
| 2009/0187766 | A1 | 7/2009 | Vuillaume et al. |
| 2010/0146292 | A1 | 6/2010 | Shi et al. |
| 2012/0023331 | A1 | 1/2012 | Altmann |
| 2013/0047250 | A1* | 2/2013 | Kothari .......................... 726/16 |
| 2014/0205099 | A1* | 7/2014 | Christodorescu et al. .... 380/278 |
| 2014/0281531 | A1* | 9/2014 | Phegade et al. ............... 713/168 |

OTHER PUBLICATIONS

International Search Report for Application No. PCT/US14/56825 dated Dec. 11, 2014.

* cited by examiner

*Primary Examiner* — Matthew Smithers
(74) *Attorney, Agent, or Firm* — Artegis Law Group, LLP (57) ABSTRACT

A security command protocol provides secure authenticated access to an auxiliary security memory within a SCSI storage device. The auxiliary security memory acts as an authenticated separate secure storage area that stores sensitive data separately from the user data area of the SCSI storage device. The security command protocol is used to access the auxiliary security memory. The security command protocol allows a trusted execution environment to transport sensitive data to and from storage in the auxiliary security memory. The regular execution environment does not have access to the security command protocol or the auxiliary security memory. The security command protocol and auxiliary security memory eliminate the need for additional secure storage components in devices that provide the security features of firmware TPM.

20 Claims, 8 Drawing Sheets

DATA BUFFER
310-4

| Byte \ Bit | 7 | 6 | 5 | 4 | 3 | 2 | 1 | 0 |
|---|---|---|---|---|---|---|---|---|
| 0 – 31 | AUTHENTICATION INFORMATION 314-3 ||||||||
| 32 – 35 | RESERVED 324-2 ||||||||
| 36 – 39 | NONCE 318-3 ||||||||
| 40 – 41 | ADDRESS 322-2 ||||||||
| 42 – 63 | RESERVED 324-3 ||||||||

FIG. 3D

DATA BUFFER
310-5

| Byte \ Bit | 7 | 6 | 5 | 4 | 3 | 2 | 1 | 0 |
|---|---|---|---|---|---|---|---|---|
| 0 | STATUS 328 ||||||||
| 1 – 31 | RESERVED 324-4 ||||||||

SECURE STORAGE WITH SCSI STORAGE DEVICES

BACKGROUND OF THE INVENTION

1. Field of the Invention

Embodiments of the invention generally relate to secure storage and, more specifically, to techniques for secure storage with SCSI storage devices.

2. Description of the Related Art

The secure storage of sensitive information is an ongoing issue in computing. Secure storage is especially important for cryptographic keys, which are oftentimes used to keep information secure or authenticate the integrity of a computer system or an application. Such keys can be stored within a discrete chip that is separate from a computer system's main processor and memory. The industry standard for implementing secure storage with a discrete chip in personal computers is the Trusted Platform Module (TPM). In addition to securely storing cryptographic keys, the TPM provides security services, so that the keys and other valuable data can remain within the TPM while the computer system performs authentication procedures.

However, the integration of an additional component, such as a TPM chip, in many types of portable devices can be difficult. Portable devices have limited space, power, and component budgets, so additional components are undesirable.

Firmware TPM has been developed to provide security comparable to TPM for portable devices. Firmware TPM relies upon a Trusted Execution Environment (TEE) to perform the security services in an execution environment that is separate from the user environment. The TEE isolates access to security services and secure storage from the rest of the system, which provides a high level of security without an additional microprocessor. Although an additional TPM chip is not required, firmware TPM still needs to store the cryptographic keys in a secure, authenticated, and separate storage area.

To provide a secure, authenticated, and separate storage area, portable devices typically include a discrete secure storage component in addition to a main storage device. The main storage device is oftentimes a small computer system interface (SCSI) storage device, such as a USB rotating device, which uses the SCSI block commands (SBC) to store user data. Although already included within portable devices, these SCSI storage devices do not provide secure storage separate from the user data area, so the discrete secure storage component is typically added to the portable device. This additional storage component may be an embedded multimedia controller (eMMC) or a discrete read-only memory (ROM). The inclusion of a discrete secure storage component, in addition to the SCSI storage device, adds cost and complexity to the design of a portable device.

As the foregoing illustrates, what is needed in the art is a technique for creating and accessing a secure authenticated separate storage area within a SCSI storage device.

SUMMARY OF THE INVENTION

One embodiment of the present invention sets forth a method for performing an authenticated communication across a data flow pathway. The method includes transmitting a copy of an authentication key from a trusted execution environment to a security memory, where both the trusted execution environment and the security memory reside within a computing device, generating authentication information within the trusted execution environment based on the authentication key, and transmitting a data buffer that includes the authentication information across the data flow pathway to the security memory. The security memory is configured to verify that the data buffer is authentic based on the authentication information and the copy of the authentication key.

One advantage of the disclosed approach is that it eliminates the need for additional secure storage components within handheld computing devices by enabling a secure storage area within a SCSI storage device. In sum, with the disclosed approach, handheld computing devices are capable of providing the security features of firmware TPM with a single SCSI storage device while avoiding the added cost and complexity of an additional system components.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
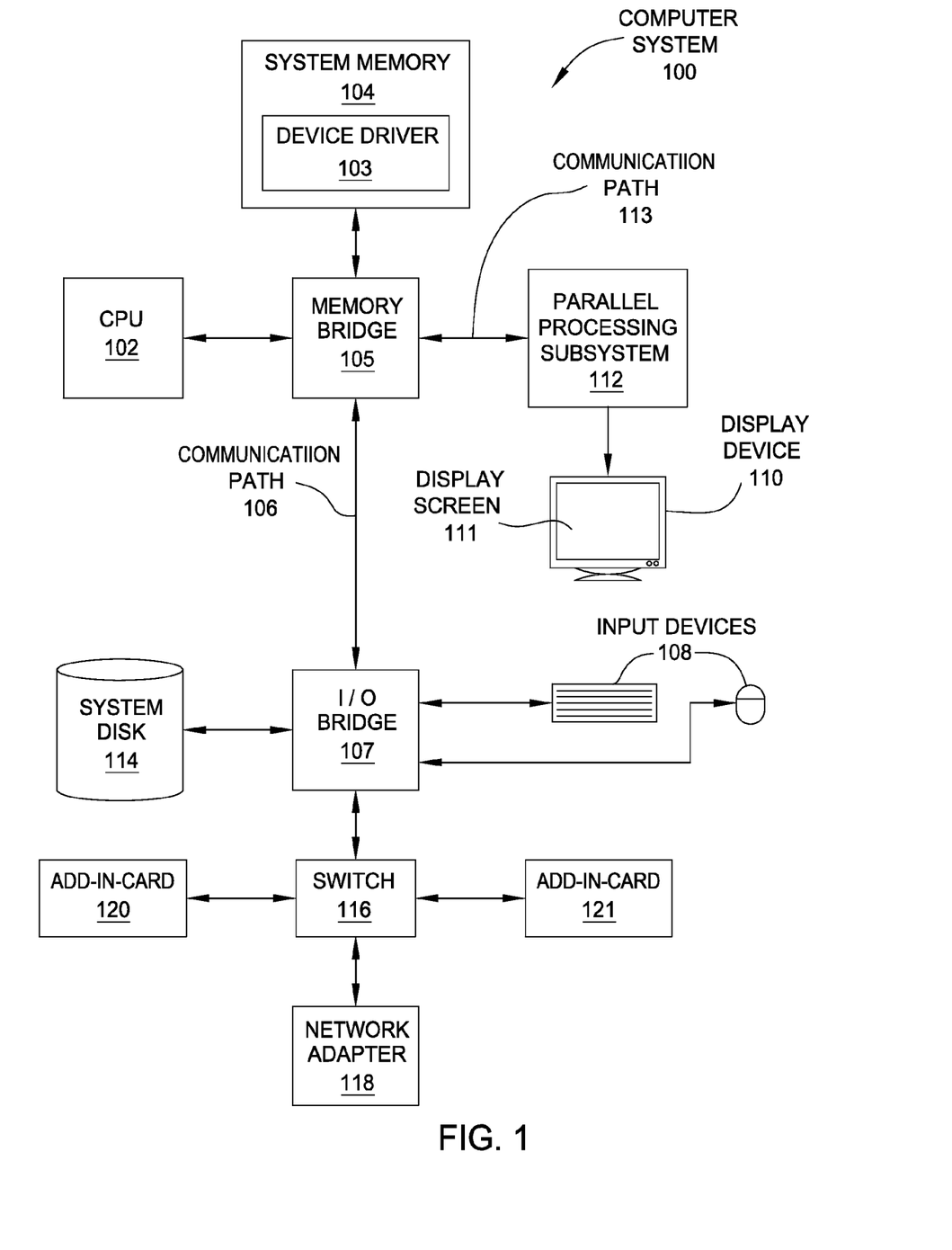
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. This circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
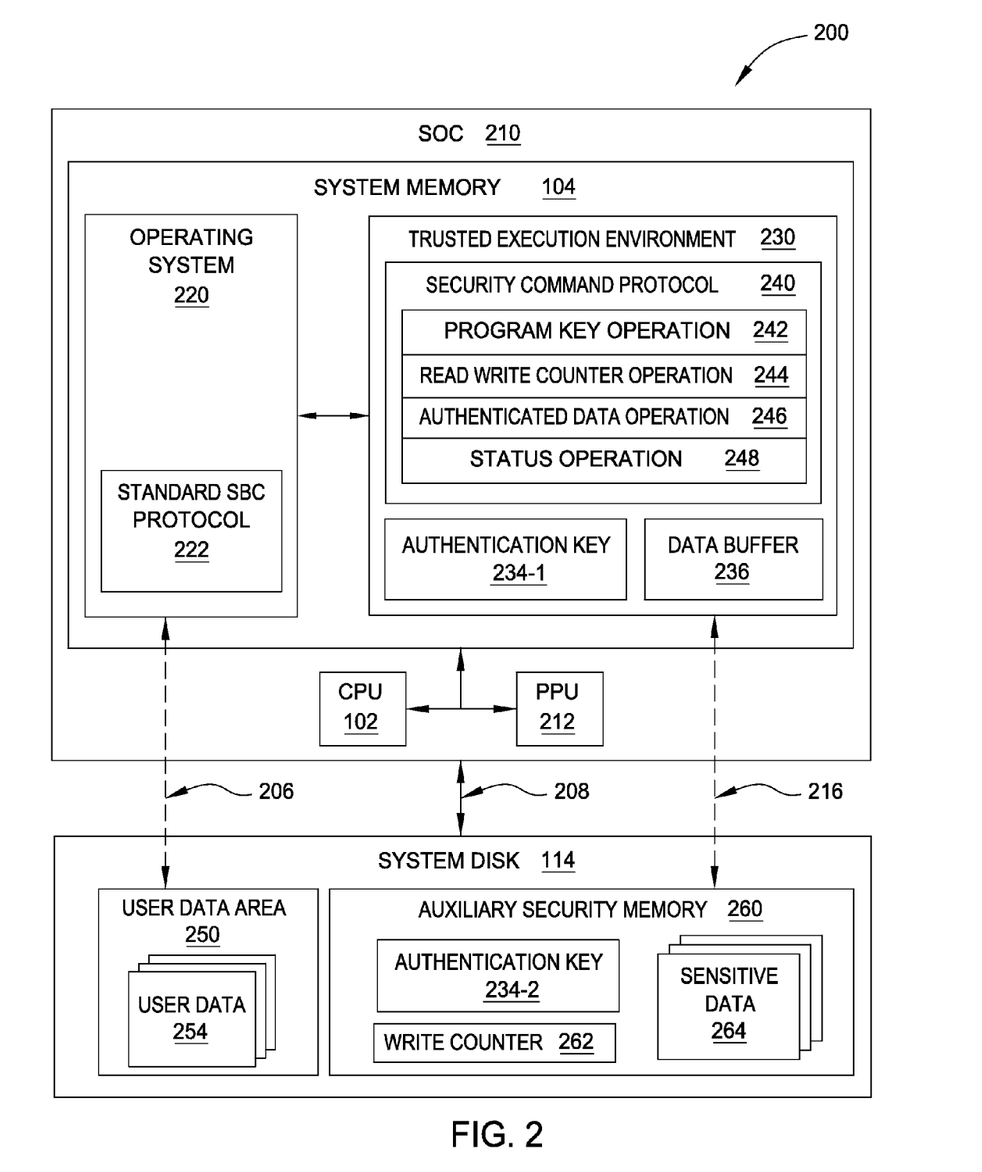
FIG. 2 is a block diagram of a portable device configured to store data of different levels of sensitivity in separate storage areas, according to one embodiment of the present invention.

Accessing a Secure Authenticated Separate Storage Area Within a SCSI Storage Device FIG. 2 is a block diagram of a portable device 200 configured to store data of different levels of sensitivity in separate storage areas, according to one embodiment of the present invention. The portable device 200 may be a mobile device, such as, for example, a cellular phone, a tablet computer, a personal digital assistant, or a laptop computer. As shown, the portable device 200 includes a system disk 114 and a SoC 210. The system disk 114 is coupled to the SoC 210 by communication interconnect 208. Communication interconnect 208 is a SCSI bus configured to transport data of different levels of sensitivity between the system disk 114 and the SoC 210.

The system disk 114 is configured as a SCSI storage device, such as a disk drive storage device. The system disk 114 includes a user data area 250 and an auxiliary security memory 260. The user data area 250 includes user data 254 and the auxiliary security memory 260 includes sensitive data 264. The sensitive data 264 may include cryptographic keys. The system disk 114 is configured to isolate the user data area 250 from the auxiliary security memory 260, so that the sensitive data 264 is stored separately from the non-sensitive user data 254. The auxiliary security memory 260 also includes an authentication key 234-2 and a write counter 262. The auxiliary security memory 260 uses the authentication key 234-2 to authenticate transmissions of sensitive data 264. The write counter 262 is configured to prevent replay attacks or limit the number of writes by tracking the number of times the SoC 210 writes sensitive data 264 to the auxiliary security memory 260. The operation of the auxiliary security memory 260 is described in greater detail below.

The SoC 210 is configured to execute user applications, user services, and security services. The SoC 210 may include similar elements to computer system 100. As shown, the SoC 210 includes CPU 102, PPU 212, and system memory 104, which are coupled together. As discussed above, the CPU 102 may be any technically feasible unit capable of processing data and/or executing software applications. As also discussed above, the PPU 212 is included within the parallel processing subsystem 112 of FIG. 1 and may operate as a graphics processor or may be used for general-purpose computation.

The system memory 104 includes an operating system (OS) 220 and a trusted execution environment (TEE) 230 coupled together. The OS 220 is configured to manage and execute user applications and user services. The OS 220 can access the user data area 250 of the system disk 114 across data flow pathway 206. Although communications between the system memory 104 and the system disk 114 occur across the communication interconnect 208, the OS 220 is generally configured to access the user data area 250 via data flow pathway 206 and does not access the auxiliary security memory 260. In order to execute the user applications and user service, the OS 220 transfers user data 254 to and from the user data area 250 via data flow pathway 206. In general, the user data 254 is not sensitive data, so the OS 220 is configured to use the standard SBC protocol 222 to transfer the user data 254.

The user application, user services, and OS 220 itself may rely upon security services. These security services may include data encryption, computer system start-up authentication, application authentication, or platform authentication for digital rights management (DRM). Instead of the OS 220 executing these security services, the OS 220 is configured to transmit requests for security services to the TEE 230.

The TEE 230 is configured to provide security services to the OS 220 and to isolate access to security services and sensitive data 264 from the OS 220. The TEE 230 may execute independently from the OS 220 and may be isolated from the OS 220 by hardware and/or one or more layers of software encryption. The TEE 230 reads and writes the sensitive data 264 to perform the security services. For instance, the TEE 230 could use an encryption key to encrypt secret financial data of a user. The TEE 230 would store the encryption key as sensitive data 264 within the auxiliary security memory 260. The security of the encrypted data would depend on the security of the sensitive data 264. If the sensitive data 264 were not secure, then a rogue agent could use the encryption key to decrypt and illegitimately access the secret financial data. The TEE 230 and auxiliary security memory 260 protect the sensitive data 264 by performing authenticated communications across data flow pathway 216.

As shown, the TEE 230 includes a security command protocol 240, an authentication key 234-1, and a data buffer 236. The security command protocol 240 is configured to provide authenticated communications between the TEE 230 and the auxiliary security memory 260. The security command protocol 240 is implemented in conjunction with the standard SBC protocol 222. The security command protocol 240 includes various operations that rely upon the SECURITY PROTOCOL IN command, the SECURITY PROTOCOL OUT command, and the data buffer 236 of the standard SBC protocol 222. The SECURITY PROTOCOL IN command transports data from the auxiliary security memory 260 to the TEE 230. The SECURITY PROTOCOL OUT command transports data to the auxiliary security memory 260 from the TEE 230. Unique 8-bit identifiers within the security protocol fields of the SECURITY PROTOCOL IN and SECURITY PROTOCOL OUT commands distinguish the various operations of the security command protocol 240 from one another.

The security command protocol 240 includes a program key operation 242, a read write counter operation 244, an authenticated data operation 246, and a status operation 248. The TEE 230 implements the program key operation 242 to transmit a copy of the authentication key 234-1 to the auxiliary security memory 260. The program key operation 242 uses the SECURITY PROTOCOL OUT command. The auxiliary security memory 260 stores the copy of the authentication key 234-1 as authentication key 234-2. Together the authentication key 234-1 and authentication key 234-2 form a shared authentication key, that is available on either side of data flow pathway 216. The authenticated communications depend upon the authentication key 234-1 being equal to the authentication key 234-2. Once a shared authentication key is established, the TEE 230 may not change the authentication key 234-1. Therefore, the TEE 230 may only use the program key operation 242 one time.

The TEE 230 generates authentication information with the authentication key 234-1 and the auxiliary security memory 260 generates authentication information with the authentication key 234-2. The authenticated communications include the authentication information. Upon receipt of an authenticated communication from the TEE 230, the auxiliary security memory 260 verifies the authenticated communication by checking the authentication information included with the authenticated communication against the authentication key 234-2. Likewise, upon receipt of an authenticated communication from the auxiliary security memory 260, the TEE 230 verifies the authenticated communication by checking the authentication information included with the authenticated communication against the authentication key 234-1.

The TEE 230 implements the read write counter operation 244 to retrieve the current value of a write counter 262 from the auxiliary security memory 260. The read write counter operation 244 uses the SECURITY PROTOCOL IN command. The authenticated data operation 246 includes the current value of the write counter 262 to show that the authenticated communications are not part of a replay attack.

The TEE 230 implements the authenticated data operation 246 to read and write sensitive data 264 to and from the auxiliary security memory 260. The authenticated data operation 246 uses the SECURITY PROTOCOL OUT command to write sensitive data 264 to the auxiliary security memory 260. The authenticated data operation 246 uses the SECURITY PROTOCOL OUT command followed by the SECURITY PROTOCOL IN command to read sensitive data 264 from the auxiliary security memory 260. When reading sensitive data 264 from the auxiliary security memory 260, the authenticated data operation 246 uses the SECURITY PROTOCOL OUT command to authenticate the SECURITY PROTOCOL IN command.

The TEE 230 implements the status operation 248 to check the status of an authenticated data operation 246. The status operation 248 uses the SECURITY PROTOCOL IN command. In response to the SECURITY PROTOCOL IN command, the auxiliary security memory 260 will transmit the status of the last authenticated data operation 246 back to the TEE 230. The status may indicate that the authenticated data operation 246 succeeded or failed.

The TEE 230 uses the various operation of the security command protocol 240 to establish and then perform authenticated communications with the auxiliary security memory 260. The authenticated communications allow the TEE 230 to access the sensitive data 264 while protecting the sensitive data 264 from illicit use. The sensitive data 264 may be used to protect other data. For example, the security command protocol 240 could be used to protect an encrypted volume. A user could protect secret financial data stored on the portable device 200 by storing the secret financial data in the encrypted volume. The encrypted volume could be encoded with an encryption key, such that the financial data could not be accessed without the encryption key. The encryption key would be stored on the auxiliary security memory 260 as sensitive data 264. The auxiliary security memory 260 would not provide access to the sensitive data 264 outside of authenticated communications with the TEE 230. To access the sensitive data 264 the TEE 230 would use the authenticated data operation 246. In order to use the authenticated data operation 246, the TEE 230 would first setup a shared authentication key using the program key operation 242. The TEE 230 would also retrieve the current value of the write counter 262 with the read write counter operation 244.

With the shared authentication key and current value of the write counter 262 setup, the TEE 230 would store the encryption key with an authenticated data operation 246. The TEE 230 would populate the data buffer 236 with the encryption key, the current value of the write counter 262, the address for the sensitive data 264 and authentication information. The TEE 230 would then instruct the auxiliary security memory 260 to retrieve the contents of the data buffer 236 with a SECURITY PROTOCOL OUT command. After retrieving the contents of the data buffer 236, the auxiliary security memory 260 would verify the authentication information and store the encryption key as sensitive data 264. The TEE 230 could then verify the status of the previous authenticated data operation 246 with the status operation 248. In response to the status operation 248, the auxiliary security memory 260 would notify the TEE 230 whether the authenticated data operation 246 was successful or not.

Once the encryption key is stored as sensitive data 264, the TEE 230 could request the sensitive data 264 with the authenticated data operation 246. The TEE 230 would start the authenticated data operation 246 by authenticating the request for the sensitive data 264. The TEE 230 would authenticate the request for the sensitive data 264, by transmitting the SECURITY PROTOCOL OUT command. The data buffer of the SECURITY PROTOCOL OUT command would include the current value of the write counter 262, the address of the sensitive data 264, and authentication information. The auxiliary security memory 260 would verify the authentication information and current value of the write counter 262 from the SECURITY PROTOCOL OUT command. The TEE 230 would follow the SECURITY PROTOCOL OUT command with a SECURITY PROTOCOL IN command. The SECURITY PROTOCOL IN command would not include additional authentication information. Having verified the authentication information and current value of the write counter 262 from the previous SECURITY PROTOCOL OUT command, the auxiliary security memory 260 would transmit the sensitive data 264 back to the TEE 230. The TEE 230 would then use the encryption key within the sensitive data 264 to unlock the encrypted volume and provide access to the secret financial data.

The data buffer 236 is configured as a section of address space within the system memory 104 that both the TEE 230 and the auxiliary security memory 260 can access. The various operations transmit information by writing the information into the data buffer 236. The SECURITY PROTOCOL OUT commands used by the program key operation 242 and authenticated data operation 246 instruct the auxiliary security memory 104 to read from the data buffer 236. The SECURITY PROTOCOL IN commands used by the read write counter operation 244, authenticated data operation 246, and status operation 248, instruct the auxiliary security memory 104 to write to data buffer 236.

During an operation, the data buffer 236 may include the current value of the write counter 262, a nonce, and sensitive data 264, or some combination thereof. The nonce is a cryptographically secure random number that provides a greater amount of entropy to the authenticated transmissions. The data buffer 236 also includes authentication information that authenticates the contents of the data buffer 236. The authentication information is stored within the first 256 bits of the data buffer 236. The arrangement of the data buffer 236 contents is discussed in greater detail below in conjunction with FIGS. 3A-3E.

As discussed, the authentication keys 234-1 and 234-2 are configured as a shared authentication key, such that the TEE 230 includes one copy of the shared authentication key, authentication key 234-1, and the auxiliary security memory 260 includes a second copy of the shared authentication key, authentication key 234-2. The authentication key 234-1 is generated from a secret identifier within the SoC 210 or from user login information. The TEE 230 transmits a copy of the authentication key 234-1 to the auxiliary security memory 260. The auxiliary security memory 260 stores the copy of authentication key 234-1 as the authentication key 234-2. The TEE 230 and the auxiliary security memory 260 keep the authentication keys 234-1 and 234-2 secret.

The TEE 230 and the auxiliary security memory 260 use the authentication keys 234-1 and 234-2 to authenticate the contents of the data buffer 236. More specifically, the TEE 230 performs a hash function using the authentication key 234-1 to generate a hash result from the contents of the data buffer 236. The hash function may be the 32-bit secure hash algorithm (SHA-256). The hash result may be a hash-based message authentication code (HMAC). The TEE 230 leaves the first 256 bits of the data buffer 236 blank while storing the current value of the write counter 262, nonce, and data within the data buffer 236. Once the current value of the write counter 262, nonce, and data are stored, the TEE 230 generates the authentication information by performing a hash function across the data buffer 236 based upon the authentication key 234-1. The TEE 230 then stores hash result as the authentication information within the first 256 bits of the data buffer 236. Thus, when the auxiliary security memory 260 retrieves the contents of the data buffer 236, the auxiliary security memory 260 uses the hash function and the authentication key 234-2 to generate a hash result. If the auxiliary security memory 260 determines that the hash result matches the authentication information within the data buffer 236, then auxiliary security memory 260 determines that contents of data buffer 236 came from the TEE 230.

Likewise, if the auxiliary security memory 260 transfers data into the data buffer 236, then the auxiliary security memory 260 also generates and stores authentication information in the data buffer 236. In such a case, the TEE 230 authenticates the transmission by generating a hash result using the hash function and the authentication key 234-1. If the TEE 230 determines that the hash result and the authentication information match, then the TEE 230 determines that the contents of the data buffer 236 came from the auxiliary security memory 260.

The TEE 230 implements the program key operation 242 to create the shared authentication key by transmitting a copy of the authentication key 234-1 to the auxiliary security memory 260. To implement the program key operation 242, the TEE 230 stores the authentication key 234-1 within the data buffer 236. Then the TEE 230 sets the security protocol field of the SECURITY PROTOCOL OUT command to identify the program key operation 242. The TEE 230 transmits the SECURITY PROTOCOL OUT command to the auxiliary security memory 260. In response to the SECURITY PROTOCOL OUT command, the auxiliary security memory 260 retrieves and stores the contents of the data buffer 236 as the authentication key 234-2. As discussed, the TEE 230 may not update the authentication keys 234-1 and 234-2. Therefore, the TEE 230 may perform the program key operation 242 once. The read write counter operation 244 and authenticated data operation 246 rely upon the authentication keys 234-1 and 234-2, so the program key operation 242 occurs before the TEE 230 can read or write sensitive data 264 with the security command protocol 240. An exemplary data buffer 236, which may be used when performing the program key operation 242, is discussed in greater detail below in conjunction with FIG. 3A.

The TEE 230 implements the read write counter operation 244 to retrieve the current value of the write counter 262 from the auxiliary security memory 260. As discussed, the write counter 262 is configured to prevent replay attacks or limit the number of times data is written to the auxiliary security memory 260. A replay attack may attempt to use portions of previous authenticated transmissions to access the sensitive data 264 illicitly. If the auxiliary security memory 260 receives a communication with the wrong value of the write counter 262, then the auxiliary security memory 260 may determine that a replay attack is occurring. To implement the read write counter operation 244, the TEE 230 populates the data buffer 236 with a nonce and the corresponding authentication information. The TEE 230 generates and stores a nonce starting at bit 256 of the data buffer 236. Then the TEE 230 performs the hash function across the contents of the data buffer 236 to generate a hash result. The TEE 230 finishes populating the data buffer 236 by storing the hash result as the authentication information in bits 0 through 255 of the data buffer 236.

Once the data buffer 236 is prepared, the TEE 230 sets the security protocol field of the SECURITY PROTOCOL IN command to identify the read write counter operation 244. The TEE 230 transmits the SECURITY PROTOCOL IN command to request that the auxiliary security memory 260 transmit the current value of the write counter 262 back to the TEE 230. In one embodiment, the read write counter operation 244 uses the SECURITY PROTOCOL IN command. In other embodiments, the TEE 230 transports the authentication information with a SECURITY PROTOCOL OUT command and then requests that the auxiliary security memory 260 transmit the current value of the write counter 262 with a SECURITY PROTOCOL IN command. If the auxiliary security memory 260 can authenticate the contents of the data buffer 236, then the auxiliary security memory 260 responds by overwriting the contents of the data buffer 236 with the current value of the write counter 262. The TEE 230 may then maintain a copy of the current value of the write counter 262 for use in the authenticated data operation 246. An exemplary data buffer 236, which may be used when performing the read write counter operation 244, is discussed in greater detail below in conjunction with FIG. 3B.

The TEE 230 implements the authenticated data operation 246 to provide authenticated transmission of sensitive data 264 to and from the auxiliary security memory 260. To write sensitive data 264 with the authenticated data operation 246, the TEE 230 populates the data buffer 236 with the current value of the write counter 262, a nonce, an address, and the sensitive data 264. The auxiliary security memory 260 verifies that a replay attack is not reusing authentication information from a previous operation by checking the current value of the write counter 316 included in the data buffer 236. As previously discussed, the nonce provides a greater amount of entropy to the authenticated transmissions. The address is the memory address within the auxiliary security memory 260 for storage of the sensitive data 264. The TEE 230 finishes preparing the data buffer 236 by performing a hash function with the authentication key 234-1 to generate a hash result.

The TEE 230 stores the hash result within the first 256 bits of the data buffer 236 as the authentication information. Once the data buffer 236 is prepared, the TEE 230 sets the security protocol field of the SECURITY PROTOCOL OUT command to identify the authenticated data operation 246. The TEE 230 transmits the SECURITY PROTOCOL OUT command to the auxiliary security memory 260. In response, the auxiliary security memory 260 retrieves the contents of the data buffer 236. If the auxiliary security memory 260 can authenticate the contents of the data buffer 236, then the auxiliary security memory 260 stores the sensitive data 264 at the address and increments the write counter 262. An exemplary data buffer 236, which may be used when writing data with the authenticated data operation 246, is discussed in greater detail below in conjunction with FIG. 3C.

To read sensitive data 264 with the authenticated data operation 246, the TEE 230 uses the SECURITY PROTOCOL OUT command to first transmit authentication information. The TEE 230 populates the data buffer 236 with authentication information, a nonce, and an address from which to retrieve the sensitive data 264. The TEE 230 sets the security protocol field of the SECURITY PROTOCOL OUT command to identify the authenticated data operation 246 and transmits the SECURITY PROTOCOL OUT command. In response to receiving the SECURITY PROTOCOL OUT command, the auxiliary security memory 260 retrieves the contents of the data buffer 236. The auxiliary security memory 260 authenticates the contents of the data buffer 236 before preparing to transmit the sensitive data 264 back to the TEE 230. If the auxiliary security memory 260 does not authenticate the contents of the data buffer 236, then the auxiliary security memory 260 does not transmit the sensitive data 264. After sending the SECURITY PROTOCOL OUT command, the TEE 230 transmits the SECURITY PROTOCOL IN command to request that the auxiliary security memory 260 transmit the sensitive data 264 back to the TEE 230. If the auxiliary security memory 260 authenticated the contents of the data buffer 236 from the SECURITY PROTOCOL OUT command, the auxiliary security memory 260 transmits the sensitive data 264 to the TEE 230. An exemplary data buffer 236, which may be used when performing a read with the authenticated data operation 246, is discussed in greater detail below in conjunction with FIG. 3D.

The TEE 230 implements the status operation 248 to retrieve the status of the last operation, such as an authenticated data operation 246. The TEE 230 sets the security protocol field of the SECURITY PROTOCOL IN command to identify the status operation 248. The TEE 230 transmits the SECURITY PROTOCOL IN command to request that the auxiliary security memory 260 reply with the status. In response to SECURITY PROTOCOL IN command, the auxiliary security memory 260 sends the status of the last operation to the data buffer 236. The TEE 230 may use the status operation 248 to check whether the writing of sensitive data 264 was successful. An exemplary data buffer 236, which is received upon performing the status operation 248, is discussed in greater detail below in conjunction with FIG. 3E.

The TEE 230 is configured to read and write to the auxiliary security memory 260 on the behalf of the OS 220 via the authenticated data operation 246. Thus, the transmission of the sensitive data 264 is authenticated and the sensitive data 264 stored within the auxiliary security module 260 is considered as authenticated. The authentication key 234-1 and the security command protocol 240 are included within the TEE 230, so neither the OS 220 or another computer system access the auxiliary security memory 260, which isolates the sensitive data 264 from the user data 254.

As discussed above, the system disk 114 is configured such that the auxiliary security memory 260 is a distinct storage area from the user data area 250. As a distinct storage area, the auxiliary security memory 260 is not be addressable through any logical block address (LBA) used within the standard SBC protocol 222. The auxiliary security memory 260 is also isolated from other operations that affect the user data area 250, such as formatting operations. The distinct storage area and the authenticated data operations 246, authentication key 234-2, and write counter 262 security aspects make the auxiliary security memory 260 a secure authenticated separate storage area within a SCSI storage device.

Figure 3A:
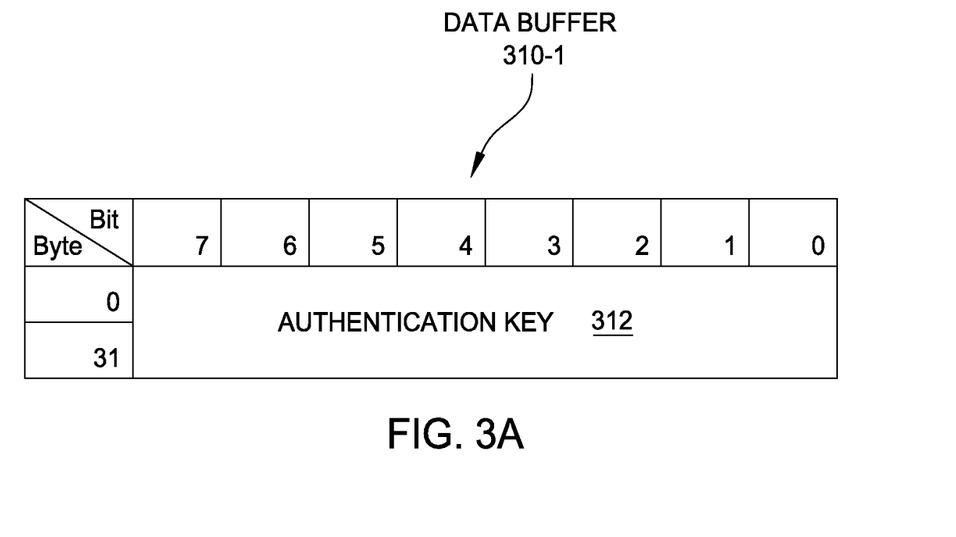
FIG. 3A illustrates a data buffer used to transmit an authentication key to the auxiliary security memory to establish a shared authentication key for authenticated data transmissions, according to one embodiment of the present invention.

FIG. 3A illustrates a data buffer 310-1 used to transmit an authentication key 312 to the auxiliary security memory 260 to establish a shared authentication key for authenticated data transmissions, according to one embodiment of the present invention. As shown, the data buffer 310-1 includes the authentication key 312. The authentication key 312 is stored in the first 256 bits, or 32 bytes, of the data buffer 310-1. In some embodiments, the program key operation 242 shown in FIG. 2 may use data buffer 310-1 to transmit a copy of authentication key 234-1 to the auxiliary security memory 260, as described above in conjunction with FIG. 2. The TEE 230 implements the program key operation 242 by copying the value of the authentication key 234-1 into the data buffer 310-1 as authentication key 312. Then the TEE 230 transmits the SECURITY PROTOCOL OUT command to the auxiliary security memory 260. In response to the SECURITY PROTOCOL OUT command, the auxiliary security memory 260 retrieves the contents of the data buffer 310-1. Then the auxiliary security memory 260 stores the authentication key 312 as the authentication key 234-2. The data buffer 310-1 does not include authentication information, because the TEE 230 and the auxiliary security memory 260 do not have a shared authentication key with which to authenticate transmissions prior to the program key operation 242.

Figure 3B:
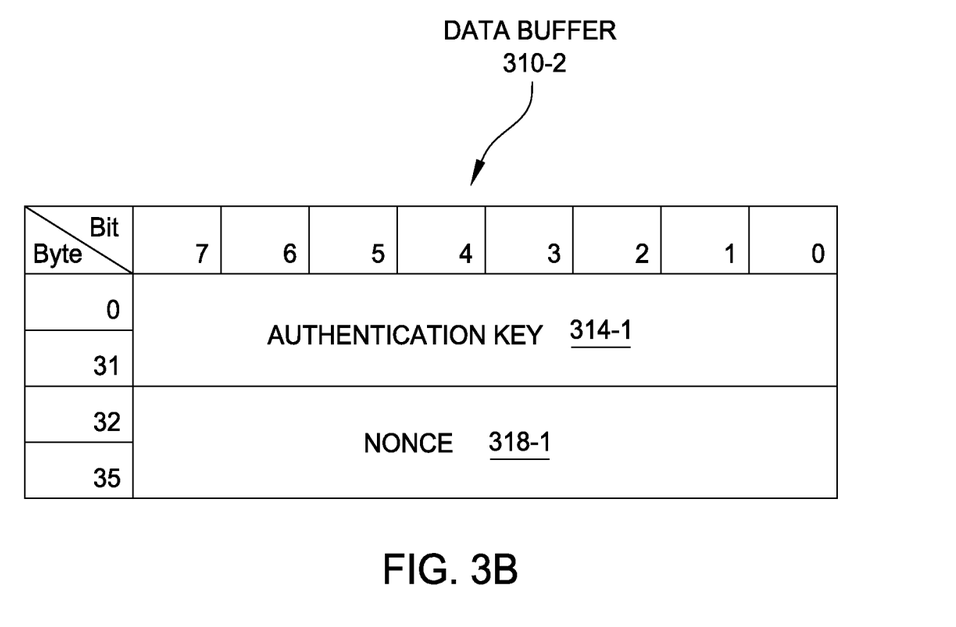
FIG. 3B illustrates a data buffer used to authenticate the request for the current value of the write counter from auxiliary security memory, according to one embodiment of the present invention.

FIG. 3B illustrates a data buffer 310-2 used to authenticate the request for the current value of the write counter 262 from auxiliary security memory 260, according to one embodiment of the present invention. As shown, the data buffer 310-2 includes a nonce 318-1 and an authentication information 314-1. The nonce 318-1 is a cryptographically secure random number. In some embodiments, the read write counter operation 244 shown in FIG. 2 may use data buffer 310-2 to transmit the authentication information 314-1 to the auxiliary security memory 260, as described above in conjunction with FIG. 2. The TEE 230 creates the authentication information 314-1 by executing a hash function, based upon the authentication key 234-1, across the nonce 318-1. The TEE 230 transmits the SECURITY PROTOCOL IN command to the auxiliary security memory 260.

In response to the SECURITY PROTOCOL IN command, the auxiliary security memory 260 retrieves the contents of the data buffer 310-2. The auxiliary security memory 260 executes a hash function, based upon authentication key 234-2, across the nonce 318-1 to generate a hash result. The auxiliary security memory 260 authenticates the read write counter operation 244 by comparing the authentication information 314-1 with the hash result. If the auxiliary security memory 260 determines that the authentication information 314-1 equals the hash result, then the data buffer 310-2 is authentic. After authenticating the contents of the data buffer 310-2, the auxiliary security memory 260 transmits the current value of the write counter 262 to the TEE 230. The auxiliary security memory 260 transmits the current value of the write counter 262 by overwriting the data buffer 310 with the current value of the write counter 262.

Figure 3C:
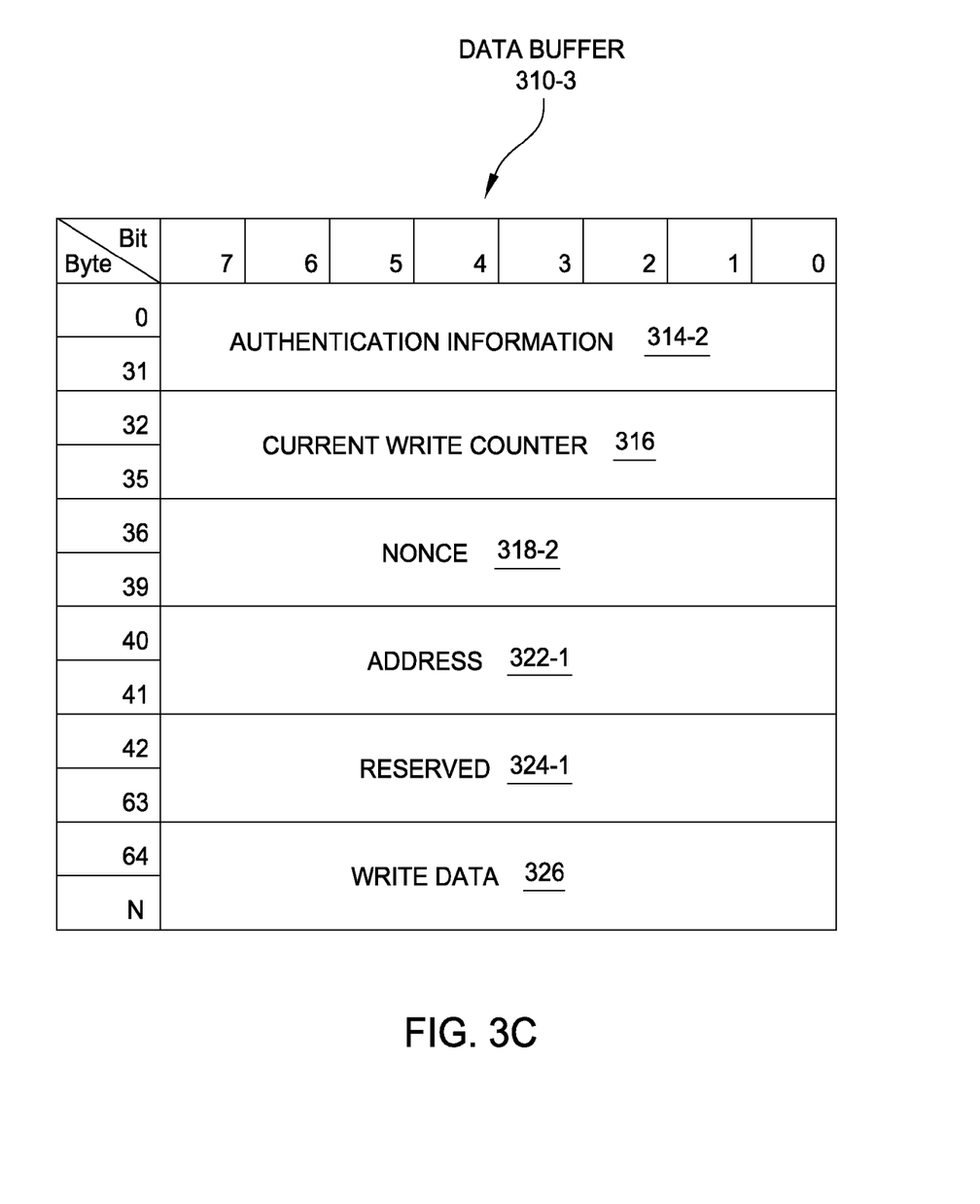
FIG. 3C illustrates a data buffer used to write sensitive data to the auxiliary security memory, according to one embodiment of the present invention.

FIG. 3C illustrates a data buffer 310-3 used to write sensitive data 264 to the auxiliary security memory 260, according to one embodiment of the present invention. The data buffer 310-3 may include similar elements to data buffer 310-2. As shown, the data buffer 310-3 includes a write data 326, a current write counter 316, a nonce 318-2, an address 322-1, a reserved 324-1, and an authentication information 314-2. In some embodiments, the authenticated data operation 246 shown in FIG. 2 may use data buffer 310-3 to write sensitive data 264 to the auxiliary security memory 260, as described above in conjunction with FIG. 2.

To implement the authenticated data operation 246 the TEE 230 stores the sensitive data 264 within the write data 326. The length of write data 326 varies according to the size of the sensitive data 264. The TEE 230 stores the total length of the data buffer 310-3 in the allocation length field included within the SECURITY PROTOCOL OUT command. As discussed, the TEE 230 sends the current value of the write counter 262 to authenticate a write, so the TEE 230 stores the current value of the write counter 262 as the current write counter 316. The nonce 318-2 is a cryptographically secure random number that the TEE 230 adds to make the transmissions more secure. The TEE 230 stores the memory address for writing the sensitive data 264 within the auxiliary security memory 260 as the address 322-1. The reserved 324-1 section of the data buffer 310-3 may be reserved for other data. The TEE 230 creates the authentication information 314-2 by executing a hash function, based upon the authentication key 234-1, across the bytes 32 through N of the data buffer 310-3. The TEE 230 transmits the SECURITY PROTOCOL OUT command to the auxiliary security memory 260.

In response to the SECURITY PROTOCOL OUT command, the auxiliary security memory 260 retrieves the contents of the data buffer 310-3. The auxiliary security memory 260 executes a hash function, based upon authentication key 234-2, across the bytes 32 through N of the data buffer 310-3 to generate a hash result. The auxiliary security memory 260 authenticates the authenticated data operation 246 by comparing the authentication information 314-2 with the hash result. If the auxiliary security memory 260 determines that the authentication information 314-2 equals the hash result, then the data buffer 310-3 is authentic. If the auxiliary security memory 260 authenticates the authentication information 314-2 with the authentication key 234-2, then the auxiliary security memory 260 stores the write data 326 at the memory address specified by address 322-1.

Figure 3D:
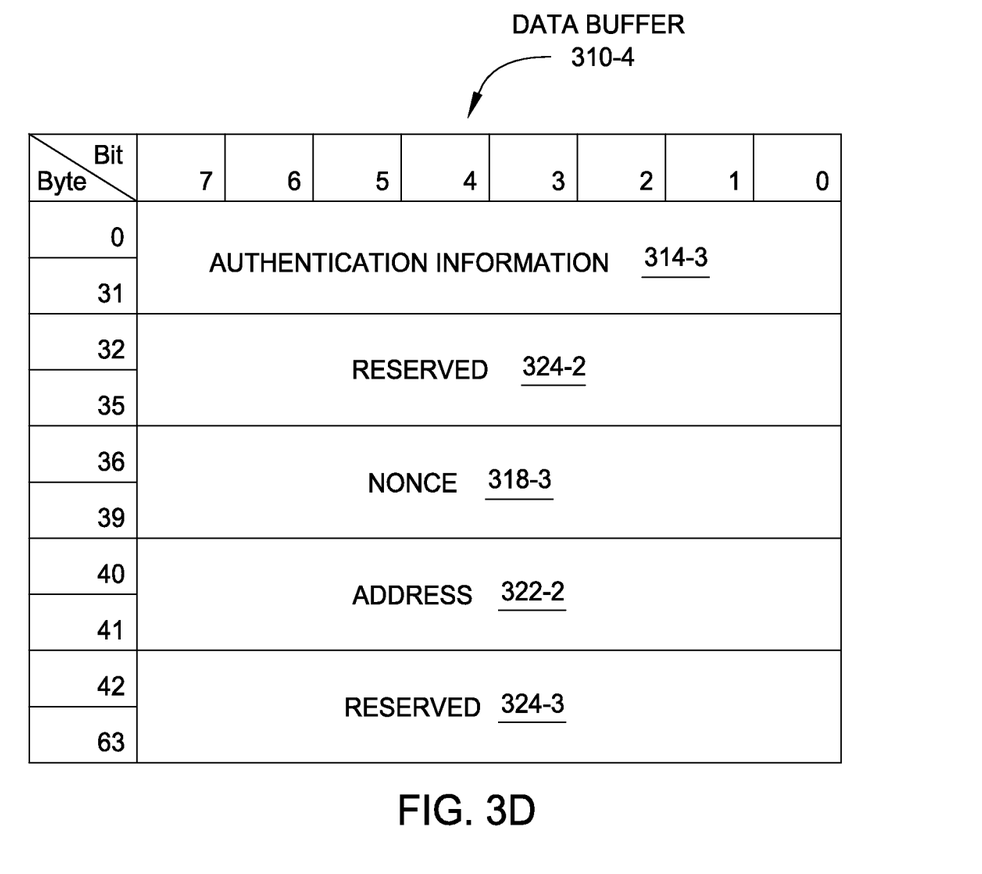
FIG. 3D illustrates a data buffer used to authenticate a request for sensitive data, according to one embodiment of the present invention.

FIG. 3D illustrates a data buffer 310-4 used to authenticate a request for sensitive data 264, according to one embodiment of the present invention. The data buffer 310-4 may include similar elements to data buffer 310-3. As shown, the data buffer 310-4 includes a nonce 318-3, an address 322-2, reserved 324-2 and 324-3, and an authentication information 314-3. In some embodiments, the authenticated data operation 246 shown in FIG. 2 may use data buffer 310-4 to authenticate a request for sensitive data 264, as discussed above in conjunction with FIG. 2. As also discussed, the nonce 318-3 is a cryptographically secure random number. The authenticated data operation 246 stores the memory address for reading the sensitive data 264 within the auxiliary security memory 260 as the address 322-2. The reserved 324-2 and 324-3 sections of the data buffer 310-4 may be reserved for other data. The TEE 230 creates the authentication information 314-3 by executing a hash function, based upon the authentication key 234-1, across the bytes 32 through 63 of the data buffer 310-4. The TEE 230 transmits the SECURITY PROTOCOL OUT command to the auxiliary security memory 260.

In response to the SECURITY PROTOCOL OUT command, the auxiliary security memory 260 retrieves the contents of the data buffer 310-4. The auxiliary security memory 260 executes a hash function, based upon authentication key 234-2, across the bytes 32 through 63 of the data buffer 310-4 to generate a hash result. The auxiliary security memory 260 authenticates the authenticated data operation 246 by comparing the authentication information 314-3 with the hash result. If the auxiliary security memory 260 determines that the authentication information 314-3 equals the hash result, then the data buffer 310-4 is authentic. After authenticating the contents of the data buffer 310-4, the auxiliary security memory 260 prepares to transmit the sensitive data 264 at address 322-2 to the TEE 230.

Figure 3E:
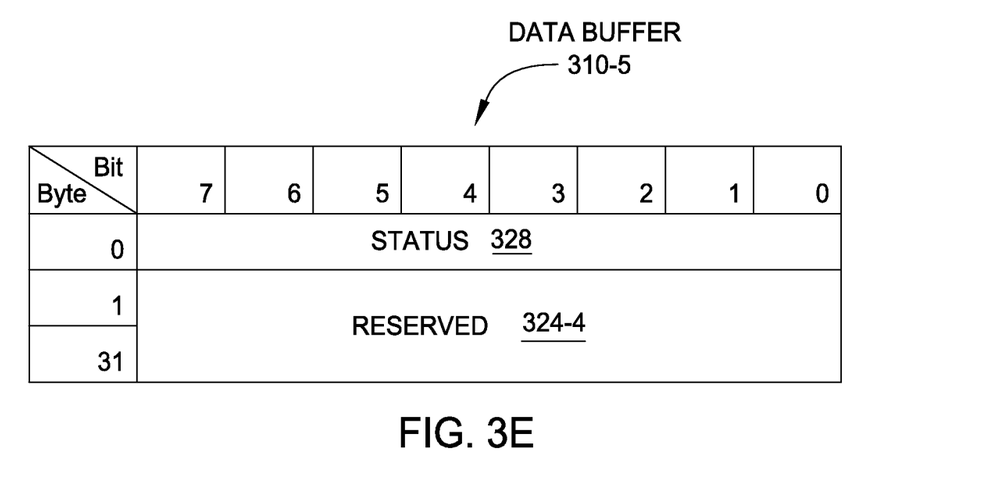
FIG. 3E illustrates a data buffer used to receive the status of the last operation from the auxiliary security memory, according to one embodiment of the present invention.

FIG. 3E illustrates a data buffer 310-5 used to receive the status of the last operation from the auxiliary security memory 260, according to one embodiment of the present invention. As shown, the data buffer 310-5 includes a status 328 and a reserved 324-4. In some embodiments, the status operation 248 shown in FIG. 2 is implemented to retrieve the status of the last operation, such as an authenticated data operation 246, as described above in conjunction with FIG. 2. The TEE 230 implements the status operation 248 by transmitting the SECURITY PROTOCOL IN command to the auxiliary security memory 260.

In response to the SECURITY PROTOCOL IN command, the auxiliary security memory 260 sends the status of the last operation to the data buffer 310-5. The auxiliary security memory 260 stores the status of the last operation in the status 328 section of the data buffer 310-5. The reserved 324-4 section of data buffer 310-5 is similar to elements of data buffer 310-4, such that reserved 324-4 may be reserved for other data.

Figure 4:
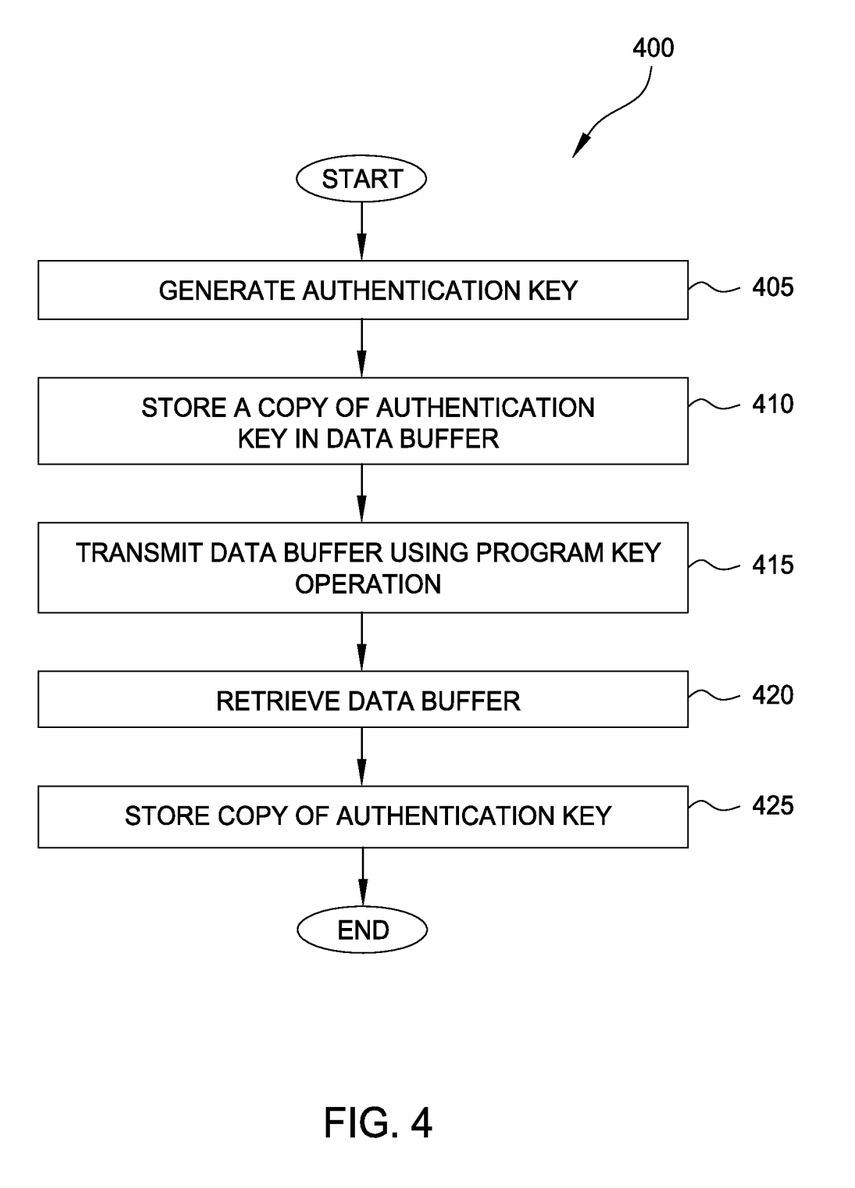
FIG. 4 is a flow diagram of method steps for sharing an authentication key with the auxiliary security memory to authenticate data transmissions, according to one embodiment of the present invention.

FIG. 4 is a flow diagram of method steps for sharing an authentication key 234-1 with the auxiliary security memory 260 to authenticate data transmissions, according to one embodiment of the present invention. Although the method steps are described in conjunction with the systems of FIGS. 1-3E, persons skilled in the art will understand that any system configured to perform the method steps, in any order, is within the scope of the present invention.

As shown, a method 400 begins at step 405, where the TEE 230 generates the authentication key 234-1. The authentication key 234-1 is generated from a secret identifier within the SoC 210 or from user login information. The TEE 230 may generate and temporarily store the same authentication key 234-1 each time the portable device 200 powers on or each time the TEE 230 initiates an authenticated transmission, instead of permanently storing the authentication key 234-1. The method 400 then proceeds to step 410.

At step 410, the TEE 230 stores a copy of authentication key 234-1 in the data buffer 236. The data buffer 236 does not include authentication information along with the copy of authentication key 234-1, because the TEE 230 and the auxiliary security memory 260 may not have a shared authentication key with which to authenticate transmissions prior to the program key operation 242. The method 400 then proceeds to step 415.

At step 415, the TEE 230 transmits the data buffer 236 to the auxiliary security memory 260 using the program key operation 242. The program key operation 242 uses the SECURITY PROTOCOL OUT command. The TEE 230 sets the security protocol field of the SECURITY PROTOCOL OUT command to identify the program key operation 242. The TEE 230 then transmits the SECURITY PROTOCOL OUT command to the auxiliary security memory 260. The method 400 then proceeds to step 420.

At step 420, the auxiliary security memory 260 retrieves the data buffer 236 from the TEE 230. The auxiliary security memory 260 retrieves the data buffer 236 in response to the SECURITY PROTOCOL OUT command. The data buffer 236 includes the copy of the authentication key 234-1. The method 400 then proceeds to step 425.

At step 425, the auxiliary security memory 260 stores the copy of the authentication key 234-1 as authentication key 234-2. Once the authentication key 234-2 is stored, the read write counter operation 244 and authenticated data operation 246 may use the authentication keys 234-1 and 234-2 to authenticate data transmitted across the data flow pathway 216. The method 400 then ends.

Figure 5:
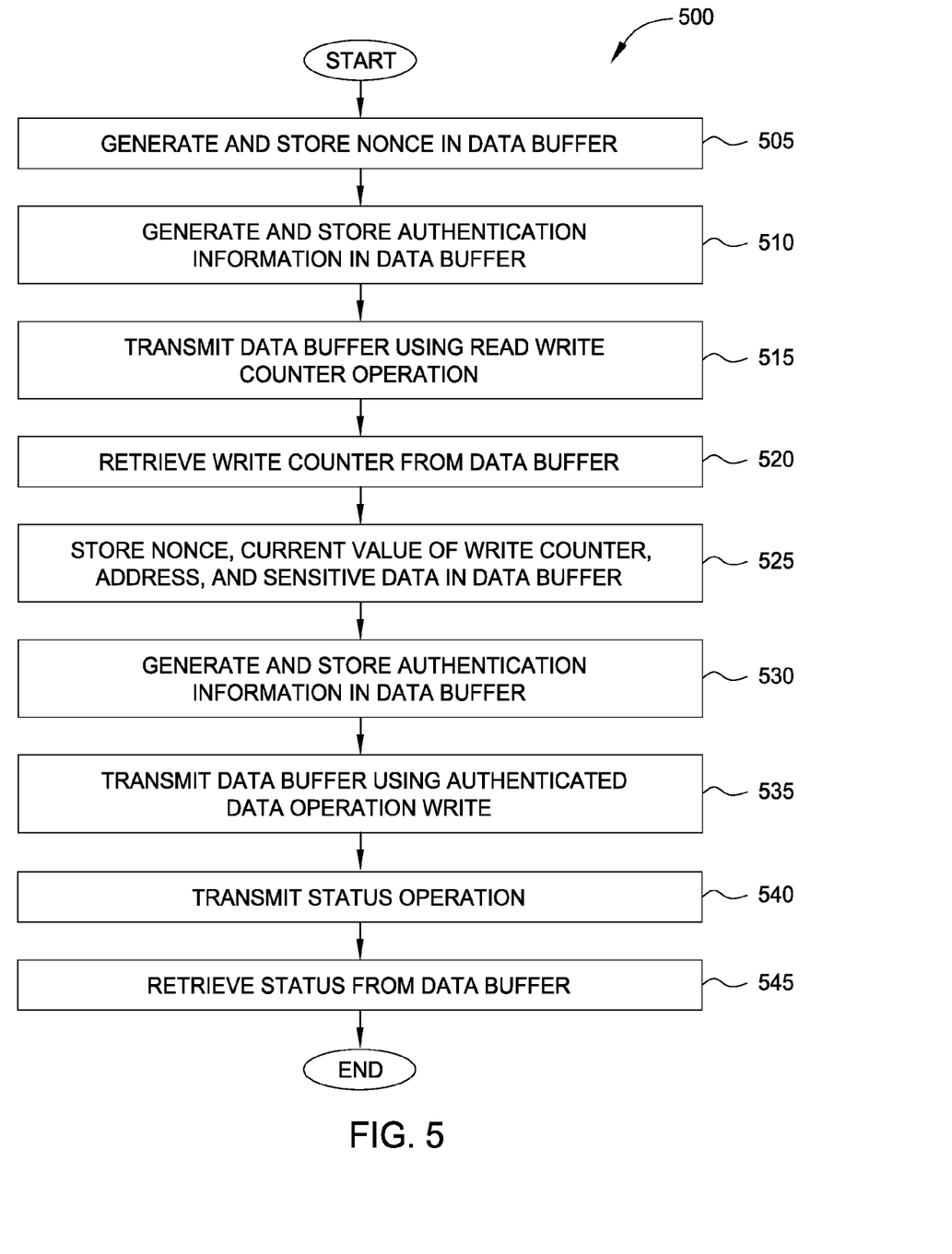
FIG. 5 is a flow diagram of method steps for writing sensitive data to the auxiliary security memory, according to one embodiment of the present invention.

FIG. 5 is a flow diagram of method steps for writing sensitive data 264 to the auxiliary security memory 260, according to one embodiment of the present invention. Although the method steps are described in conjunction with the systems of FIGS. 1-3E, persons skilled in the art will understand that any system configured to perform the method steps, in any order, is within the scope of the present invention.

As shown, a method 500 begins at step 505, where the TEE 230 generates and stores the nonce within data buffer 236. The nonce is a cryptographically secure random number that provides a greater amount of entropy to the authenticated transmissions. The method 500 then proceeds to step 510.

At step 510, the TEE 230 generates and stores authentication information in the data buffer 236. The TEE 230 creates the authentication information by executing a hash function, based upon the authentication key 234-1, across the contents of the data buffer 236. The TEE 230 stores the authentication information in the first 256 bits of the data buffer 236. The method 500 then proceeds to step 515.

At step 515, the TEE 230 transmits the data buffer 236 to the auxiliary security memory 260 using the read write counter operation 244. The read write counter operation 244 uses the SECURITY PROTOCOL IN command. The TEE 230 sets the security protocol field of the SECURITY PROTOCOL IN command to identify the read write counter operation 244. In response to the SECURITY PROTOCOL IN command, the auxiliary security memory 260 retrieves the contents of the data buffer 236. The auxiliary security memory 260 executes a hash function, based upon authentication key 234-2, across contents of the data buffer 236 to generate a hash result. The auxiliary security memory 260 authenticates the read write counter operation 244 by comparing the authentication information with the hash result. If the auxiliary security memory 260 determines that the authentication information equals the hash result, then the data buffer 236 is authentic. If the auxiliary security memory 260 can authenticate the contents of the data buffer 236, then the auxiliary security memory 260 responds by overwriting the contents of the data buffer 236 with the current value of the write counter 262. The method 500 then proceeds to step 520.

At step 520, the TEE 230 retrieves the current value of the write counter 262 from the data buffer 236. The method 500 then proceeds to step 525.

At step 525, the TEE 230 stores the nonce, the current value of the write counter 262, an address, and the sensitive data 264 in the data buffer 236. The TEE 230 again generates a cryptographically secure random number as the nonce. The TEE 230 increments and stores the current value of the write counter 262 for future use with the authenticated data operation 246. The method 500 then proceeds to step 530.

At step 530, TEE 230 generates and stores the authentication information in the data buffer 236. The TEE 230 creates the authentication information by executing a hash function, based upon the authentication key 234-1, across the contents of the data buffer 236. The TEE 230 stores the authentication information in the first 256 bits of the data buffer 236. The method 500 then proceeds to step 535.

At step 535, the TEE 230 transmits the data buffer 236 to the auxiliary security memory 260 using the authenticated data operation 246. The authenticated data operation 246 uses the SECURITY PROTOCOL OUT command to transmit data from the TEE 230 to the auxiliary security memory 260. The TEE 230 sets the security protocol field of the SECURITY PROTOCOL OUT command to identify the authenticated data operation 246. In response to the SECURITY PROTOCOL OUT command, the auxiliary security memory 260 retrieves the contents of the data buffer 236. The auxiliary security memory 260 executes a hash function, based upon authentication key 234-2, across the contents of the data buffer 236 to generate a hash result. The auxiliary security memory 260 authenticates the authenticated data operation 246 by comparing the authentication information with the hash result. If the auxiliary security memory 260 determines that the authentication information equals the hash result, then the data buffer 236 is authentic. If the auxiliary security memory 260 can authenticate the contents of the data buffer 236, then the auxiliary security memory 260 stores the sensitive data 264 at the address and increments the write counter 262. The method 500 then proceeds to step 540.

At step 540, the TEE 230 transmits the status operation 248 to retrieve the status of the proceeding authenticated data operation 246. The status operation 248 uses the SECURITY PROTOCOL IN command. The TEE 230 sets the security protocol field of the SECURITY PROTOCOL IN command to identify the status operation 248. In response to status operation 248, the auxiliary security memory 260 sends the status of the proceeding authenticated data operation 246 to the data buffer 236. The method 500 then proceeds to step 545.

At step 545, the TEE 230 retrieves the status of the proceeding authenticated data operation 246 from the data buffer 236. The status indicates that the proceeding authenticated data operation 246 was successful or unsuccessful. The method 500 then ends.

Figure 6:
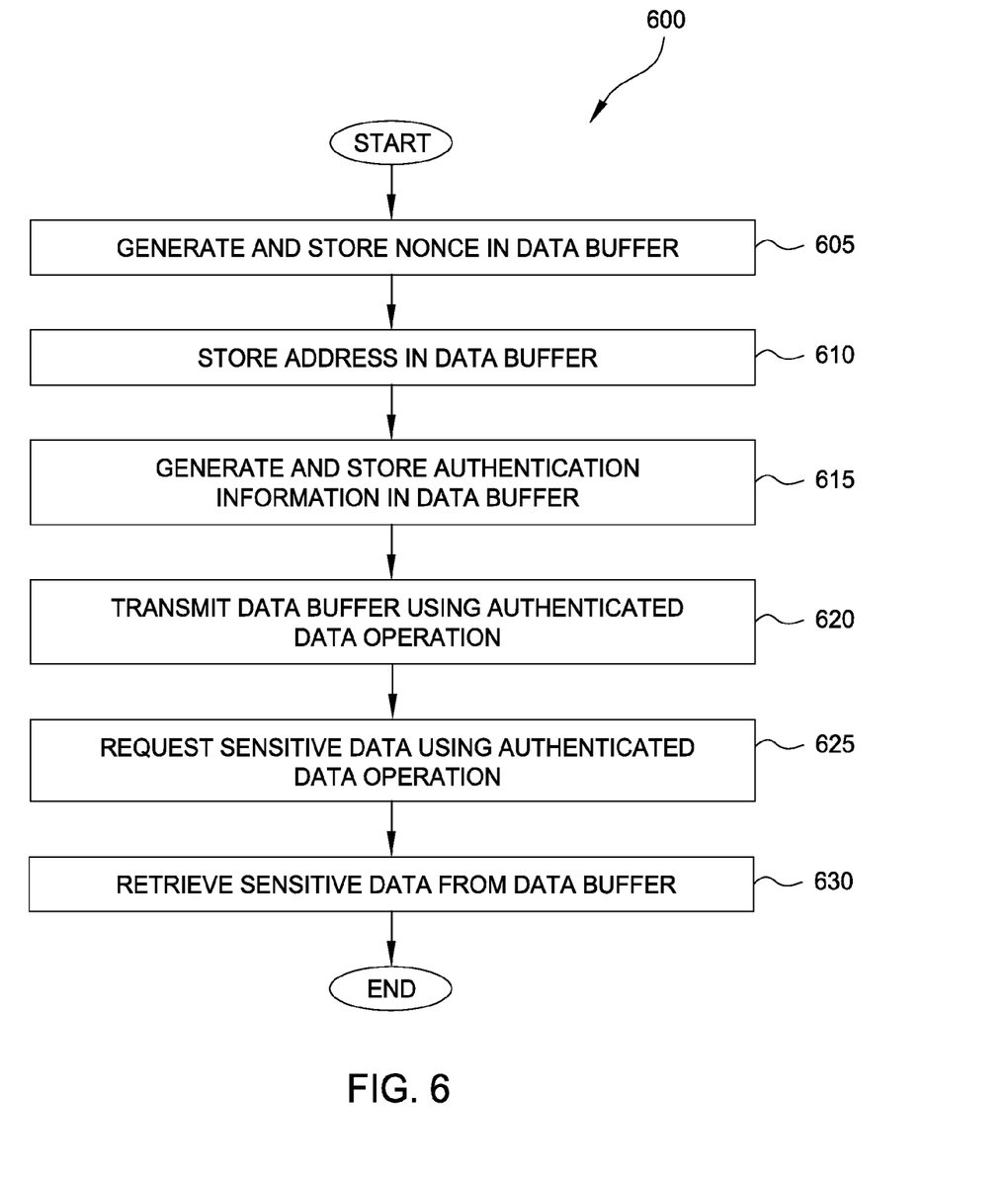
FIG. 6 is a flow diagram of method steps for reading sensitive data from the auxiliary security memory, according to one embodiment of the present invention.

FIG. 6 is a flow diagram of method steps for reading sensitive data 264 from the auxiliary security memory 260, according to one embodiment of the present invention. Although the method steps are described in conjunction with the systems of FIGS. 1-3E, persons skilled in the art will understand that any system configured to perform the method steps, in any order, is within the scope of the present invention.

As shown, a method 600 begins at step 605, where the TEE 230 generates and stores the nonce within data buffer 236. The nonce is a cryptographically secure random number. The method 600 then proceeds to step 610.

At step 610, the TEE 230 stores an address in the data buffer 236. The address is the memory address for reading the sensitive data 264 within the auxiliary security memory 260. The method 600 then proceeds to step 615.

At step 615, TEE 230 generates and stores authentication information in the data buffer 236. The TEE 230 creates the authentication information by executing a hash function, based upon the authentication key 234-1, across the contents of the data buffer 236. The method 600 then proceeds to step 620.

At step 620, the TEE 230 transmits the data buffer 236 to the auxiliary security memory 260 using the authenticated data operation 246. The authenticated data operation 246 uses the SECURITY PROTOCOL OUT command to transmit data from the TEE 230 to the auxiliary security memory 260. The TEE 230 sets the security protocol field of the SECURITY PROTOCOL OUT command to identify the authenticated data operation 246. In response to the SECURITY PROTOCOL OUT command, the auxiliary security memory 260 retrieves the contents of the data buffer 236. The auxiliary security memory 260 executes a hash function, based upon authentication key 234-2, across the contents of the data buffer 236 to generate a hash result. The auxiliary security memory 260 authenticates the authenticated data operation 246 by comparing the authentication information with the hash result. If the auxiliary security memory 260 determines that the authentication information equals the hash result, then the data buffer 236 is authentic. If the auxiliary security memory 260 can authenticate the contents of the data buffer 236, then the auxiliary security memory 260 prepares to transmit the requested sensitive data 264. The method 600 then proceeds to step 625.

At step 625, the TEE 230 requests the sensitive data 264 using the authenticated data operation 246. The authenticated data operation 246 uses the SECURITY PROTOCOL IN command to request that the auxiliary security memory 260 transmit data to the TEE 230. The TEE 230 sets the security protocol field of the SECURITY PROTOCOL IN command to identify the authenticated data operation 246. If the auxiliary security memory 260 successfully authenticated the contents of the data buffer 236, then the auxiliary security memory 260 transmits the requested sensitive data 264. If the auxiliary security memory 260 did not successfully authenticate the contents of the data buffer 236, then the auxiliary security memory 260 does not transmit the requested sensitive data 264 to the TEE 230. The method 600 then proceeds to step 630.

At step 630, the TEE 230 retrieves the sensitive data 264 from the data buffer 236. The TEE 230 may then utilize the sensitive data 264 to perform a security service. The method 600 then ends.

In sum, the techniques disclosed above provide an auxiliary security memory within a SCSI storage device. The SCSI storage device is divided into the user data area and the auxiliary security memory. The auxiliary security memory acts as an authenticated separate secure storage area. A security command protocol created within the existing SECURITY PROTOCOL IN and SECURITY PROTOCOL OUT commands of the SCSI primary command set allows a TEE operating within the portable device to transport sensitive data to and from the auxiliary security memory. The regular execution environment accesses the user data area, not the auxiliary security memory.

One advantage of the disclosed approach is that it eliminates the need for additional secure storage components within handheld computing devices by enabling a secure storage area within a SCSI storage device. In short, with the disclosed approach, handheld computing devices are capable of providing the security features of firmware TPM with a single SCSI storage device while avoiding the added cost and complexity of an additional system components.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of the present invention is determined by the claims that follow.

What is claimed is:

1. A computer-implemented method for performing an authenticated communication across a data flow pathway, the method comprising:
   transmitting a copy of an authentication key from a trusted execution environment to a security memory, wherein both the trusted execution environment and the security memory reside within a computing device;
   generating authentication information within the trusted execution environment based on the authentication key;
   transmitting a data buffer that includes the authentication information across the data flow pathway to the security memory, wherein the security memory is configured to verify that the data buffer is authentic based on the authentication information and the copy of the authentication key.

2. The method of claim 1, wherein transmitting comprises transmitting the data buffer via a read-write counter operation that causes the security memory to overwrite data included in the data buffer with a current value of a write counter maintained by the security memory.

3. The method of claim 2, further comprising generating second authentication data within the trusted execution environment based on the authentication key, and storing the second authentication information, the current value of the write counter, an address, and sensitive data in the data buffer.

4. The method of claim 3, further comprising transmitting the data buffer across the data flow pathway to the security memory via an authenticated data operation, that causes the security memory to verify that the data buffer is authentic based on the second authentication information and the copy of the authentication key.

5. The method of claim 4, further comprising, after the data buffer has been authenticated, storing the sensitive data in the security memory at the address.

6. The method of claim 4, further comprising requesting and receiving a status of the authenticated data operation via a status operation.

7. The method of claim 1, wherein the data buffer further includes an address, and transmitting comprises transmitting the data buffer via a first authenticated data operation that causes the security memory to retrieve data from the data buffer and verify that the data buffer is authentic.

8. The method of claim 7, further comprising requesting sensitive data that is stored in the security memory at the address via a second authenticated data operation.

9. The method of claim 8, further comprising, after verifying that the data buffer is authentic, transmitting the sensitive data to the data buffer.

10. The method of claim 9, further comprising retrieving the sensitive data from the data buffer.

11. A non-transitory computer-readable storage medium including instructions that, when executed by a processing unit, cause the processing unit to perform an authenticated communication across a data flow pathway, by performing the steps of:
    transmitting a copy of an authentication key from a trusted execution environment to a security memory, wherein both the trusted execution environment and the security memory reside within a computing device;
    generating authentication information within the trusted execution environment based on the authentication key;
    transmitting a data buffer that includes the authentication information across the data flow pathway to the security memory, wherein the security memory is configured to verify that the data buffer is authentic based on the authentication information and the copy of the authentication key.

12. The computer-readable medium of claim 11, wherein transmitting comprises transmitting the data buffer via a read-write counter operation that causes the security memory to overwrite data included in the data buffer with a current value of a write counter maintained by the security memory.

13. The computer-readable medium of claim 12, further comprising generating second authentication data within the trusted execution environment based on the authentication key, and storing the second authentication information, the current value of the write counter, an address, and sensitive data in the data buffer.

14. The computer-readable medium of claim 13, further comprising transmitting the data buffer across the data flow pathway to the security memory via an authenticated data operation that causes the security memory to verify that the data buffer is authentic based on the second authentication information and the copy of the authentication key.

15. The computer-readable medium of claim 14, further comprising requesting and receiving a status of the authenticated data operation via a status operation.

16. The computer-readable medium of claim 11, wherein the data buffer further includes an address, and transmitting comprises transmitting the data buffer via a first authenticated data operation that causes the security memory to retrieve data from the data buffer and verify that the data buffer is authentic.

17. The computer-readable medium of claim 16, further comprising requesting sensitive data that is stored in the security memory at the address via a second authenticated data operation.

18. The computer-readable medium of claim 17, further comprising retrieving the sensitive data from the data buffer after the security memory transmits the sensitive data to the data buffer.

19. A computing device, comprising:
    a trusted execution environment associated with one or more processing entities; and
    a security memory coupled to the trusted execution environment via a dataflow pathway,
    wherein the trusted execution environment is configured to:
      transmit a copy of an authentication key to the security memory,
      generate authentication information based on the authentication key, and transmit a data buffer that includes the authentication information across the data flow pathway to the security memory, and wherein the security memory is configured to:

verify that the data buffer is authentic based on the authentication information and the copy of the authentication key.

20. The computing device of claim 19, wherein the trusted execution environment is configured to write sensitive data to an address in the security memory or retrieve sensitive data from an address in the security memory via one or more authenticated data operations.

\* \* \* \* \*